United States Patent Office 3,303,245
Patented Feb. 7, 1967

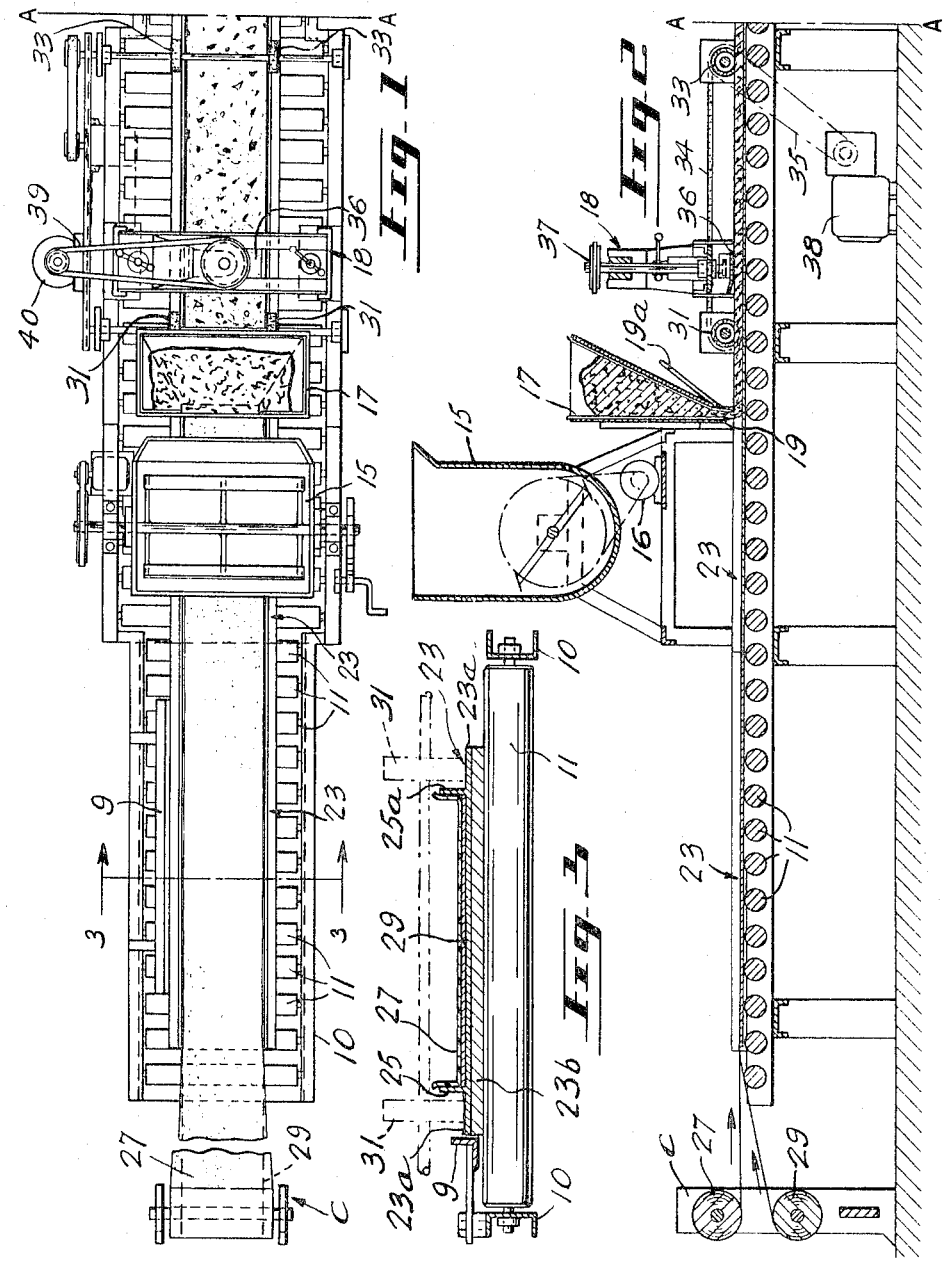

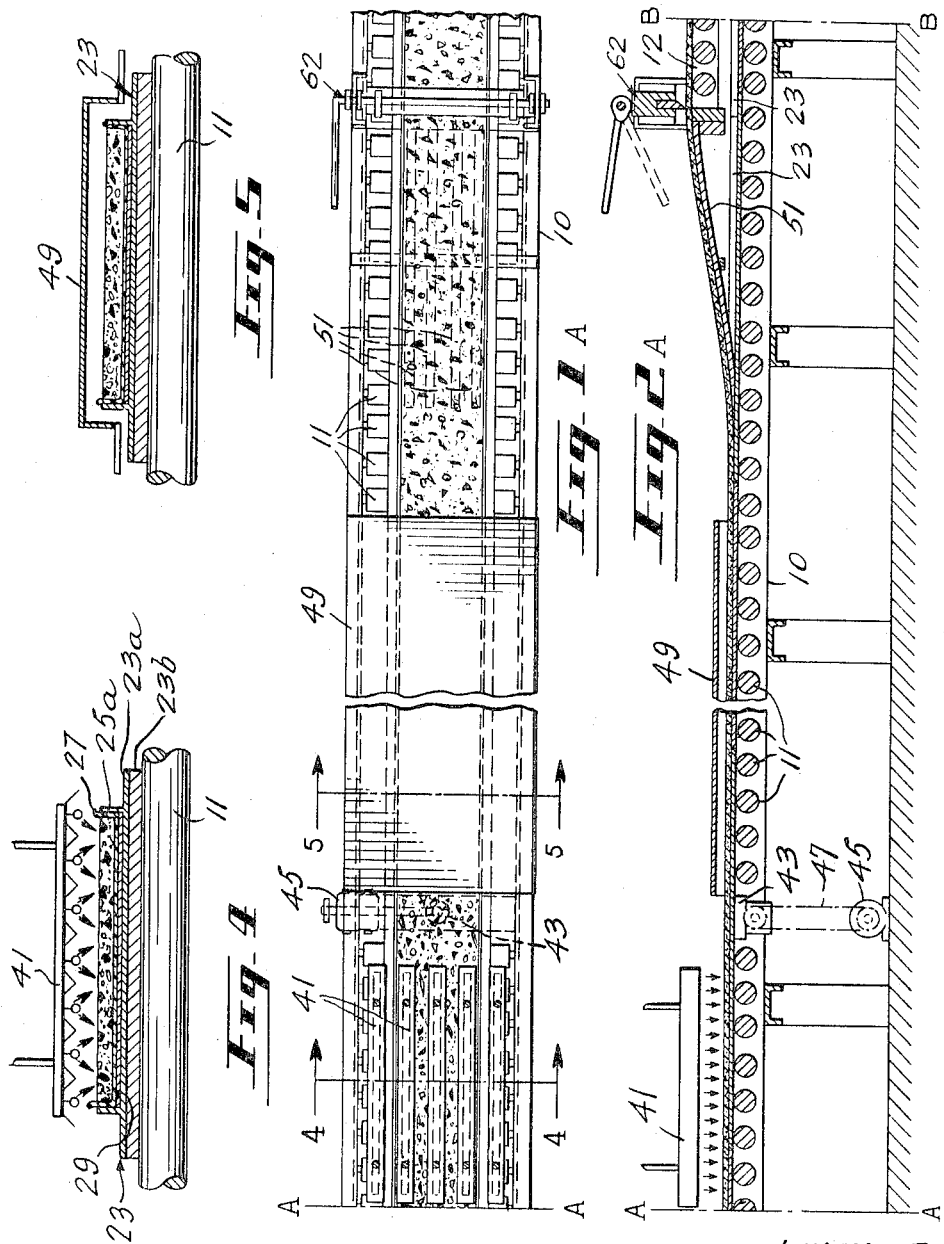

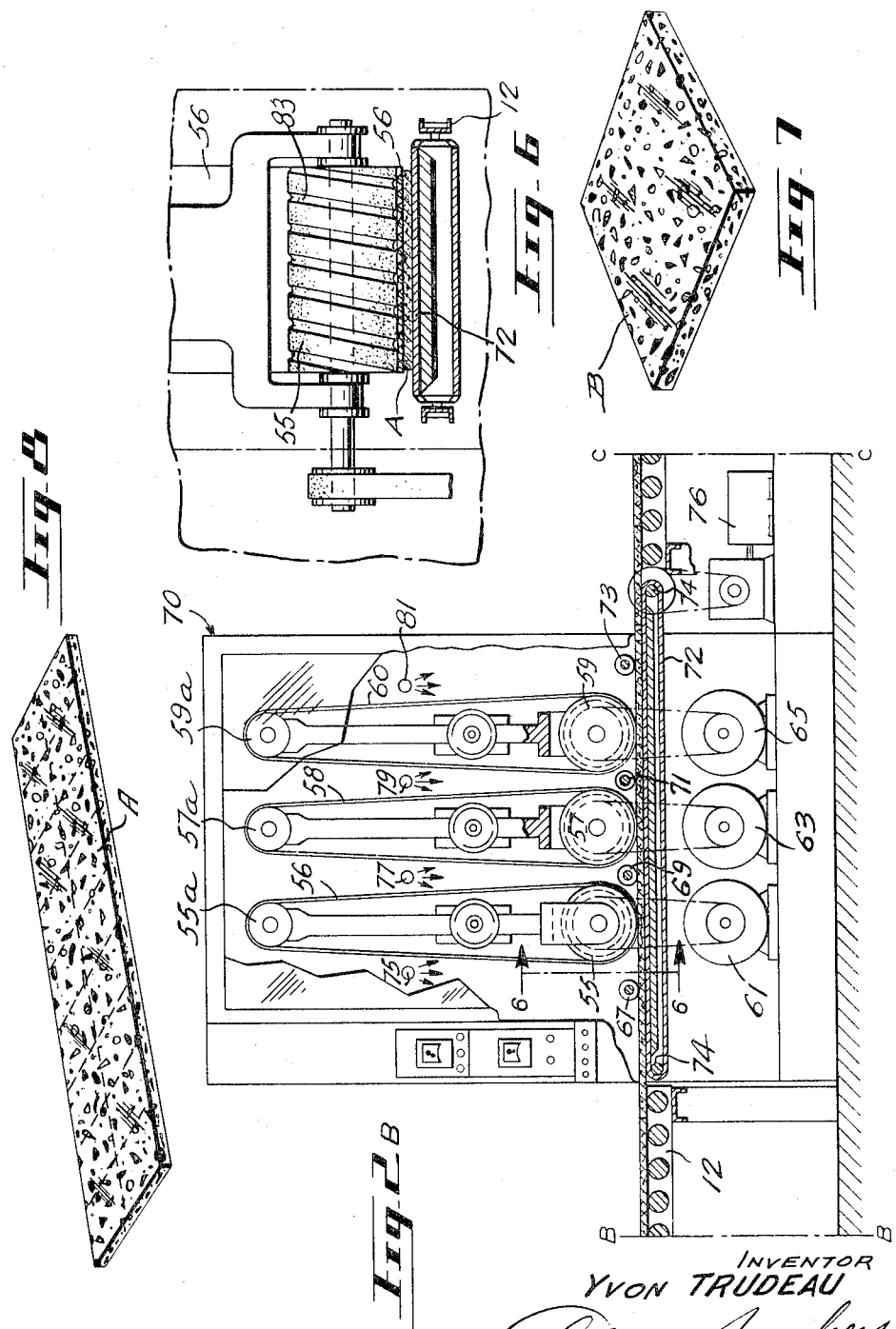

3,303,245
PROCESS FOR PRODUCTION OF TILE PRODUCTS
Yvon Trudeau, Louiseville, Quebec, Canada, assignor to Terraz Epoxy Inc., Louiseville, Quebec, Canada
Filed Sept. 9, 1963, Ser. No. 307,539
4 Claims. (Cl. 264—70)

This invention relates to a process for producing tile products.

More particularly, in one of its aspects, this invention relates to resinous tile products having improved physical and chemical characteristics compared to similar known products made of resin alone, and which have the appearance of terrazzo or natural marble to provide a highly decorative tile product.

At the present time, tile products are made from thermosetting, or more commonly, thermoplastic resins. Examples of such resins are the vinyl resins, butadiene resins, styrene resins, etc. Tiles containing these resins include at the most, 5 to 15 or 20% of the resin, the remainder being inert filler. Although recent technological advances have developed different types of copolymers having improved physical properties—e.g. tensile strength, substantially all known tiles are "soft," that is, susceptible to marring, organic and inorganic solvents, etc. making them unsuitable for commercial application. Therefore, there is an evergrowing need for a tile product suitable for commercial application which is durable, and at the same time, resists solvents.

On the other hand, artificial marble tiles have been made which are composed mainly of inorganic compounds held together with a binder. These simulated products do not possess the same physical and/or chemical characteristics as the natural products, and in practice "break-down" or decompose after relatively short periods of use.

The present development overcomes the above disadvantages, and offers a tile product having superior physical and chemical characteristics. In accordance with this invention, a tile product includes a mixture of fine and/or large mineral aggregates intimately mixed and bonded together by an epoxy resin cured to a solidified self-supporting article. The cured product, with the aggregates dispersed evenly throughout, has a substantially uniform density, and presents a highly decorative three-dimensional appearance.

The term "fine" aggregates denotes sand, stone fines or similar hard matter, for example suitable plastics having sufficient hardness, e.g. rubber derivatives, polyolefins; etc. having a particle size of from about 40 to about 200 ASTM (American Standard for Testing Materials). The tile product of this invention includes the fine aggregates, based on the total weight of all aggregates, in an amount of from about 0 to about 90% by weight of the ingredients, and preferably from about 20 to about 40%. The exact amount of fines will depend on the type of product desired.

The term "large" aggregates denotes stone chips, marble chips, or similar hard matter, for example suitable plastics having sufficient hardness, e.g. rubber derivatives, polyolefins, etc. ranging in size from about $\frac{1}{8}$ to about 3", preferably from about $\frac{1}{8}$ to about $\frac{1}{2}$" in size. In practice, the product will contain, based on the total weight of all aggregates, from about 10% to about 100% by weight of large aggregates, desirably 60%.

The epoxy resins employed are those derived from bisphenol A and epichlorohydrin. The bisphenol A component may be replaced by other diphenols, glycols or glycerine, but are generally not as suitable as bisphenol A. Examples of suitable resins include those marketed under the trademarks "Epon 815," "Epon 826," "Epon 828" and mixtures thereof.

The epoxy resin will be present in an amount of from about 2½% to about 50% by weight, based on the total weight of all aggregates, of the ingredients in the product, and preferably 7½ to about 12½%. It will be understood that the weight of the epoxy resin includes the required amount of catalyst to effect cross-linking to cure the resin. One of the more common catalysts is diethyltriamine. In general, the amount of catalyst will vary from about 0.8% to about 1.25% by weight.

According to the present invention, a typical process for producing the tile products includes the steps of intimately admixing (I) of from about 2½% to about 50% by weight, based on the total weight of all aggregates, of an epoxy resin together with a catalyst therefore with (II) from about 0 to about 90% by weight of fine aggregates and (III) about 10% to about 100% by weight of large aggregates to form a viscous flowable mixture in which substantially all of the particles of the aggregates are uniformly dispersed throughout and coated with a layer of resin. The mixture is then spread on the supporting surface and vibrated for a period of time sufficient to remove any gas contained in the mixture. Subsequently the mixture is heated to a temperature sufficient to cure and set the resin to produce the cured self-supporting sheet tile product.

According to a preferred embodiment of the process, the ingredients when thoroughly mixed are poured into a mould of a desired shape and first vibrated in a horizontal direction and subsequently in a vertical direction. The mixture, in the mould, is preferably cured by subjecting it to infra-red heat sufficient to cure the resin and evaporate any gases generated by the cross-linking agent. The temperature at which the resin is heated will vary depending on for example, the thickness of the mixture, the distance from the heating source, time, etc. For example, the curing may be carried out at a temperature of about 240° F. for about 10 minutes for a product having a thickness of $\frac{3}{8}$ to $\frac{5}{8}$". It is desirable that immediately after heating the resin to a curing temperature the product is retained at that temperature to permit the product to cure slowly, e.g. by passing the mixture through an enclosed space.

Subsequent to this operation, the cured tile product is removed from its mould and abraded or polished with diamond dust or similar suitable means to obtain a smooth surface. If desired, the product can be cut into different sizes and shapes, depending on its intended use.

In accordance with the invention, there is also provided an apparatus capable of carrying out the process in a continuous line sequence and for this purpose includes, in combination with an elongated roller conveyor frame, the following apparatus arranged in operational sequence:

(a) Mixing apparatus to mix the epoxy resin with the fine and large aggregates, (b) A material delivery hopper adapted to deliver the mixture in a controlled flow to a continuous sequence of moulding forms, (c) Agitating means adapted to level said mixture within said moulding forms, (d) Heating means adapted to heat the mixture as it is conveyed, (e) Means to further agitate the heated mixture within the moulds to remove trapped air, (f) Heat retaining means through which the moulds pass to cure and set epoxy resin in the mixture, (g) Means to separate the cured mixture from the moulds as a continuous strip, and (h) Means to polish the resultant tile product and separate it into predetermined lengths.

The special moulding forms utilized with this apparatus are of an open ended tray-like formation and are aligned in sequence on the conveyor frame so that they proceed in juxtaposed relationship constituting in effect an elongated continuous mould extending the length of the operational path.

Having thus generally described the apparatus used to carry out the invention particular reference will be made to the accompanying drawings, showing a preferred embodiment thereof, and in which;

FIGURE 1 is a plan view of a first portion of the apparatus, including the mixing apparatus, the material delivery apparatus and the first agitating means including means for moving the aligned mould sections through the apparatus, FIGURE 1a is a continuation of the apparatus of FIGURE 1 at A—A showing in plan view the material heating apparatus, the second agitating means, the heat retaining or curing chamber and the apparatus for separating the cured mixture from the mould portions including a cutting apparatus for separating the cured mixture strip into elongated portions for subsequent polishing, etc., FIGURE 2 is a side view of the apparatus corresponding to FIGURE 1, FIGURE 2a is a side view of the apparatus corresponding to FIGURE 2 being a continuation of FIGURE 2 from the line A—A, FIGURE 2b is aside view of a further continuation of the apparatus not shown in plan from the line B—B of FIGURE 2a and including a grinding and polishing apparatus, FIGURE 3 is a cross-sectional view of the apparatus showing the relationship of conveyor roller, mould portion and mould guide means as seen along the line 3—3 of FIGURE 1, FIGURE 4 is a cross-sectional view of the apparatus as seen along the line 4—4 of FIGURE 1a showing the relationship of conveyor roller, mould section, and mixture heating means at that point, FIGURE 5 is a cross-sectional view of the apparatus as seen along the line 5—5 of FIGURE 1a to illustrate the relative positions of conveyor roller, mould section containing heated mixture and curing chamber section, FIGURE 6 is an enlarged section of FIGURE 2b taken along the line 6—6 to show in more detail a typical roller mounting an abrasive belt for polishing, FIGURE 7 is a view in perspective elevation of a finished tile product produced in accordance with the invention, and FIGURE 8 is a similar view of the incompletely hardened ribbon product before cutting and polishing, indicating by dotted lines the lines of cutting.

As shown in the side elevational view of FIGURES 2, 2a and 2b of the drawings and in plan in FIGURES 1 and 1a, the apparatus is shown as having an elongated conveyor frame 10 provided with freely rotating conveyor rollers 11. In accordance with the invention, mould sections 23 of tray-like formation having upstanding flanges 25, 25a at each side spaced inwardly from each marginal edge 23a are placed in sequence on the conveyor rollers 11 and moved along until the tray passes beneath a mixing device 15 and into engagement with drive rollers 31 and 33 forming part of a first vibrating machine 18 as will be described in more detail later. The rollers 31 and 33 engage the marginal portions of the mould section 23 as shown in FIGURE 3 so that the section 23 is moved ahead as it received the mixture from a material delivery machine 17 as will also be described later.

The mould section, prior to receiving its supply of material, is lined with a release agent to prevent the material from sticking to the mould. Such a release agent is generally supplied by an apparatus indicated by C in the form of a paper web. The apparatus C includes supply rolls 27 and 29, roll 27 supplying a web of "Mylar" sheet material, while roll 29 provides a web of paper material, for example kraft paper, to line the mould 23. As shown most clearly in FIGURE 3, the upper or Mylar layer 27 is sufficiently wide to overlap the mould section flanges 25, 25a to prevent adhesion at these points. The lower plate or base 23b of each mould section is preferably of non-metallic material for example, plywood or the like.

With this arrangement, it will be appreciated that as subsequent mould sections 23 are added they are aligned by engagement with a guide bar 9 attached at one side of the frame 10, filled with the mixture they combine to form a substantially continuous elongated mould extending along the length of the conveyor frame to the point where the material is extracted from the moulds as will be described.

The first station or apparatus passed by the mould sections 23 is a material mixing device 15 into which the ingredients, in the present case the epoxy resin and aggregate, are charged. This apparatus 15 is operated through suitable driving means, for example an electric motor 16 as shown, and is capable of being tilted about a horizontal axis so as to dump the mixed materials into the material delivery machine 17 which consists essentially of a hopper having a lever operated lower opening or slice 19 which permits a controlled flow of the mixture into each tray section 23 as it passes underneath. As will be apparent by reference to FIGURES 1 and 2 of the drawings, once the front portion of the mould 23 is engaged by the rollers 31, 33 of the vibrating machine 18 the handle 19a of the delivery device 19 can be set to provide an even flow proportionate to the speed of travel of the mould portions.

The vibrating machine 18 has, in addition to the drive rollers 31, 33 which now act as the means whereby the mould sections are now moved along the conveyor frame, a horizontally concentric vibrating smoothing plate 36 which is actuated through an adjustable cam and pulley arrangement 37 to compact the mixture into a substantially even layer as it passes through this portion of the apparatus. A drive is provided to the drive rollers 31, 33 through endless chains 34, 35 from a geared motor drive 38 while the drive to the plate actuating assembly 37 is made through a belt 39 from a motor 40. The vibration imposed by plate 36 has been found to assist the drive rolls 31, 33 in moving the line of mould sections forward.

As shown in FIGURE 2a the now compacted mixture in the mould sections 23 are pushed along the conveyor frame 10 into and through a heating assembly 41 consisting of a plurality of infra-red lamps with suitable reflectors so that the mixture is heated across the width of the moulds as they progress.

Following the heating assembly 41, there is provided a second vibrating means 43 adapted to vibrate the mould containing the mixture in a vertical manner, i.e. up and down to remove any air bubbles which may be located in the mixture. The vibrating means 43 is driven by electric motor 45 through a belt 47.

The mould sections 23 are then pushed into and through a covered section 49 of the conveyor frame where it is allowed to cool relatively slowly. The main purpose of the section 49 is to retain the heat imparted to the mixture by the infra-red assembly 41 for a sufficient length of time to effect the cure of the epoxy resin used in the mixture. The length of the section 49, of course, will be varied to suit the conveying speed, necessary curing time for any particular mixture, etc.

As the now cured mixture is in a sufficiently solid state to be self-supporting it is now brought into contact with a plurality of spaced lifting blades 51 which are disposed relative to the upper surface of the mould sections 23 to pass under the separating layers 27, 29 so as to separate the elongated product ribbon from the mould sections while the mould sections 23 continue along the frame 10 for subsequent return to the start of the conveyor frame as described. The cured stock is raised by the blades 51 to a further conveyor frame level 12 where it is severed into elongated sections A as shown in FIGURE 8 by a cutting machine 62. The sections of stock thus formed are fed into and through a polishing apparatus 70 by the engagement of an endless belt 72 mounted between rollers 74 and driven by a motor 76, see FIGURE 2b.

The abrasive or polishing machine 70 includes a series of three rollers 55, 57 and 59 respectively, each of which in turn has an accompanying roller 55a, 57a and 59a. Each pair of these rollers, for example 55 and 55a, carry sanding belts 56, 58 and 60 respectively to sand the tile product to any desired finish.

The apparatus 65 includes motors 61, 63 and 65 to drive the respective rollers 55, 57 and 59. Pressure rollers 67, 69, 71 and 73 are adapted to retain the tile product in alignment when passing through the machine. Also, there is included spray means, indicated at 75, 77, 79 and 81, to supply water to the tile product as it is being sanded for the purpose of lubricating it. In this respect the rollers 55, 57 and 59, roller 55 being shown in greater detail in FIGURE 6, are provided with spiral indentations 83 to permit the water and air to circulate through the roll to serve as a cooling factor. This polishing apparatus is well known in the art and, therefore, further details are not thought necessary for its complete understanding.

The polished products so obtained are then passed along the conveyor frame 12 to a suitable location where they are cut or sawed transversely to form the finished tiles, as is well known, and shown generally as B in FIGURE 7.

The tile products of this invention find many different uses in varied fields. Primarily, they are intended for use as tiles for flooring, panels, etc. in commercial applications where improved physical characteristics are required. Such applications include, for example, flooring for hospitals, laboratories, etc. Other uses contemplated for the products of this invention include decorative panels for artistic working, e.g. sculpturing, etc.

The tile products of this invention have many distinct advantages over known tile products, exemplary of which are:

(1) They possess vastly improved tensile characteristics. For example, a tile product of this invention including an amount of 10% epoxy resin possesses tensile strength three times that of conventional terrazzo tile products in place that of ready mix concrete types of a similar thickness.

(2) They resist all abrasive forces other than that of diamond.

(3) They resist, to all intents and purposes, all organic and inorganic solvents.

(4) They are completely waterproof.

(5) They possess a coefficient of expansion 25 times that of pre-mix concrete or terrazzo tiling.

(6) The products of this invention lend themselves to a multitude of colour combinations.

(7) They have a complete uniformity of design.

(8) They possess fastness and uniformity of colours resulting in the possibility of extending old surfaces without any difference in colour shades.

(9) They possess ease of application of the products as compared to conventional products.

(10) They possess a striking decorative effect equivalent to that of a three-dimensional article, permitting novel architectural applications never before possible with tile products.

One of the more important advantages of the tile product is its impermeability to gas and moisture. When polished, the surface of the tile products, due to its extreme uniformity, does not have any pores in which dust or bacteria can gather. Such products are highly desirable in hospitals or similar institutions where porosity of a product cannot be tolerated for obvious reasons. An associated side advantage is that when the tile products are cut, their uniform density permits cutting to a very small tolerance, permitting tiles to be juxtaposed side by side with substantially invisible joints.

It will be understood that certain modifications may be incorporated into the process, product and apparatus of this invention, and that these are intended to be within its scope.

For example, it is contemplated that a fire-retardant agent may be incorporated into the product in an amount sufficient to impart to the tile product the property or self-extinguishabilty. For example, the applicant has found that titanium oxide and/or antimony oxide individually or together in an amount of from about 10 to about 20% by weight of the ingredients of the product is sufficient to impart non-burning characteristics to the tile products.

Additionally, suitable additives, for example, dyes, stabilizers, flexibilizers, conditioners, etc. may be added to the admixture to obtain desired characteristics in the tile product. Such additives are not generally incorporated into the admixture of the epoxy resin and the aggregates in an amount of greater than 2%.

Tile products of this invention possess a vastly enhanced tensile strength. The strength of a tile product having the epoxy resin present in an amount of from about 10%, the remainder being aggregates with additives, possesses a 7,000 p.s.i. rating, several times that of conventional tiles.

I claim:

1. A continuous process for manufacturing self-supporting sheet tile, comprising, continuously forming an intimately mixed resinous composition composed of (A) from about 0 to about 90% by weight, based on the total weight of the aggregates in the mixture, of fine aggregate having as ASTM size of from about 40 to about 200, and from about 10% to about 90% by weight, based on the total weight of the aggregates in the mixture, of large aggregate having a size of from about ⅛″ to about 3″, and (B) from about 2½% to about 12½% by weight, based on the weight of the aggregates, of an epoxy resin including a catalyst therefor, continuously spreading said composition to a desired depth on a series of mould sections arranged for movement in a line upon a generally horizontal support, the mould sections having side rims arranged in alignment and having rimless juxtaposed transverse edges, the mould sections being covered by a continuous layer of mould release agent, moving the continuous ribbon of resinous composition so formed sequentially through a heating station, a vibrating station, a mould separating station, and a polishing station, continuously vibrating said supporting surface as said mixture is spread thereon first in a horizontal direction and subsequently in a vertical direction as it passes through said vibrating station, where the composition is in a heated condition, to free any gas contained in said mixture and produce a composition free from gaseous occlusions, maintaining the mixture in a heated condition after passing through said heating station for sufficient time to cure and set the epoxy resin, continuously separting the incompletely hardened self-supporting ribbon of solidified mixture from the mould sections as it passes through said mould separating station, and polishing at least one surface of the solidified ribbon to obtain a sheet tile product having a three-dimensional decorative effect.

2. A continuous process as defined in claim 1 wherein said large aggregate is present in amount based on the weight of the aggregates of about 60% to about 80% and the said fine aggregate is present in amount based on the weight of the aggregates of 20% to 40%.

3. A continuous process for manufacturing artificial tiles having a terrazzo appearance and high tensile strength comprising, continuously forming an intimately mixed resinous composition composed of (A) from about 0 to about 90% by weight, based on the total weight of the aggregates in the mixture, of fine aggregate having an ASTM size of from about 40 to about 200, and from about 10% to about 90% by weight, based on the total weight of the aggregates in the mixture, of large aggregate having a size of from about 1/8" to about 3", and (B) from about 2½% to about 12½% by weight, based on the weight of the aggregates, of an epoxy resin including a catalyst therefor, continuously spreading said composition to a desired depth on a series of mould sections arranged for movement on a roller support, the mould sections having aligned sides and having rimless juxtaposed transverse edges, the mould sections being covered by a continuous layer of a mould release agent, moving the continuous ribbon of resinous composition so formed sequentially through a heating station, a vibrating station, a mould separating station, a tile cutting station, and a polishing station, continuously vibrating said supporting surface as said mixture is spread thereon first in a horizontal direction and subsequently in a vertical direction as it passes through said vibrating station, where the composition is in a heated condition, to free any gas contained in said mixture and produce a composition free from gaseous occlusions, maintaining the mixture in a heated condition after passing through said heating station for sufficient time to cure and set the epoxy resin, separating the incompletely hardened ribbon of solidified mixture from the mould sections as it passes through said mould separating station, cutting the incompletely hardened ribbon into tiles, and polishing one surface of the grouped tiles as they pass through the polishing station.

4. A continuous process as defined in claim 3 wherein said large aggregate is present in amount based on the weight of the aggregates of about 60% to about 80% and the said fine aggregate is present in amount based on the weight of the aggregates of 20% to 40%.

References Cited by the Examiner
UNITED STATES PATENTS

| | | | |
|---|---|---|---|
| 2,195,683 | 4/1940 | Ross et al. | 25—99 |
| 2,271,845 | 2/1942 | Parsons | 264—145 XR |
| 2,483,498 | 10/1949 | Lewon et al. | 264—69 |
| 2,507,302 | 5/1950 | Hedstrom | 264—72 XR |
| 2,835,996 | 5/1958 | De Paoli | 264—162 XR |
| 2,849,417 | 8/1958 | Tsang | 260—37 |
| 2,915,490 | 12/1959 | Hopper et al. | 260—37 |
| 3,002,249 | 10/1961 | Jackson | 25—99 |
| 3,012,901 | 12/1961 | Reese | 264—124 XR |
| 3,055,077 | 9/1962 | Gerwick | 264—69 |
| 3,174,977 | 3/1965 | Hoiberg et al. | 260—37 XR |

ROBERT F. WHITE, *Primary Examiner.*

MORRIS LIEBMAN, ALEXANDER H. BRODMERKEL, *Examiners.*

J. W. BEHRINGER, J. A. FINLYASON,
*Assistant Examiners.*